United States Patent [19]
Curl et al.

[11] 4,209,109
[45] Jun. 24, 1980

[54] TUBER PLANTER MONITOR

[76] Inventors: Robert B. Curl, 1960 Floral Ave., P.O. Box 562; Fred Foss, 359 Taylor, both of Twin Falls, Id. 83301

[21] Appl. No.: 11,571

[22] Filed: Feb. 12, 1979

Related U.S. Application Data

[63] Continuation of Ser. No. 769,523, Feb. 17, 1977, abandoned.

[51] Int. Cl.² ........................... A01C 7/04; G01F 7/00
[52] U.S. Cl. ........................................... 221/7; 111/1; 116/204; 335/205
[58] Field of Search ........................... 116/204; 111/1; 335/205; 222/622, 23, 48; 340/672; 221/7

[56] References Cited

U.S. PATENT DOCUMENTS

| | | | |
|---|---|---|---|
| 2,141,044 | 12/1938 | Rassmann | 111/34 |
| 3,011,036 | 11/1961 | La Rocca | 335/205 X |
| 3,185,118 | 5/1965 | Greene | 222/23 X |
| 3,249,713 | 5/1966 | Briggs | 335/205 |
| 3,355,102 | 11/1967 | Gregory, Jr. | 221/7 X |
| 3,445,796 | 5/1969 | Spiroch et al. | 335/205 |
| 3,648,631 | 3/1972 | Fiedler et al. | 111/1 X |
| 4,011,959 | 3/1977 | Papasideris | 335/205 X |

FOREIGN PATENT DOCUMENTS 962714  1/1964  United Kingdom .................... 111/1 X

*Primary Examiner*—Daniel M. Yasich
*Attorney, Agent, or Firm*—Trask & Britt

[57] ABSTRACT

A tuber planter employing a conveyor with feed cups to discharge seed tubers into a furrow and having an electromagnetic monitor thereon to signal the continuous operation of the conveyor is disclosed. The monitor comprises a permanent magnet protectively encased in a cover attached to a sprocket of the continuous conveyor which it monitors. A reed switch activated by a permanent magnet is protectively located adjacent to said sprocket. A housing preferably encloses at least a portion of the sprocket. The permanent magnet triggers the reed switch once each revolution of the sprocket so that an electrical signal sent from the reed switch to a remote location is interrupted or an electric signal can be intermittently generated by closing of the switch so that the operation of the continuous conveyor may be monitored, e.g., by a flashing light from a remote location. The device is especially useful for tuber planters and the like wherein a planter is trailed behind a tractor and the display device for the monitor is mounted on the tractor so that the tractor operator will know that the planter is operating.

5 Claims, 5 Drawing Figures

TUBER PLANTER MONITOR

This is a continuation of application Ser. No. 769,523, filed Feb. 17, 1977 now abandoned.

BACKGROUND OF INVENTION

Field: The instant invention relates to monitor devices for monitoring the continuous operation of a conveyor of a tuber planter wherein a signal may be remotely displayed from the planter to signal the operation or inoperation of the planter.

Other devices which may be utilized for this purpose include photoelectric cells wherein the light emitter may be located on one side of the sprocket of the continuous conveyor and the receiving cell located on the other side of the sprocket with an opening in the sprocket whereby the emitter may trigger the receiver once each revolution of the sprocket. Although these devices work well while the planter is clean, it is commonplace for dirt to be carried up the conveyor since the seed is discharged near the ground and dirt is kicked into the buckets and onto the belt so that the sprocket frequently becomes encased with dirt and any opening therein filled so that an erroneous signal of non-operation transmitted even though the planter is operating, thus resulting is an unnecessary stop to check the planter.

RELATED APPLICATIONS

This application is related to application Ser. No. 608,559, filed Aug. 28, 1975, and now Pat. No. 3,982,671, by Mr. Robert Curl, one of the applicants herein, and is commonly owned therewith.

OBJECTS OF INVENTION

It is an object of the instant invention to provide a remote monitor to monitor the operation of a tuber planter.

It is a further object of the instant invention to provide an electromagnetic monitor which provides accurate signaling of the operation under all conditions of operation.

It is a further object of the instant invention to provide an electromagnetic monitor which is simple to install, easy to maintain and substantially fail-safe.

A still further object of the instant invention is to provide an electromagnetic monitor which is rugged and can withstand the rigors of attachment to a tuber planter.

DESCRIPTION OF THE INVENTION

Agricultural planters of various types, particularly tuber planters such as those used for planting peanuts, potatoes and other tubers, frequently have conveyor means with cups or other means for holding a seed tuber so that the tuber is spaced in its planting. As illustrated in copending application Ser. No. 608,559, the tuber is dropped from a continuous conveyor at a point near the ground.

An electromagnetic monitor for monitoring the operation of the seed conveyor has been invented whereby a permanent magnet is securely attached to one of the sprockets in the conveyor chain. A reed switch, activated by the proximate passage of the permanent magnet, is located adjacent the same sprocket so that the reed switch is activated once each revolution of the sprocket.

Figure 1:
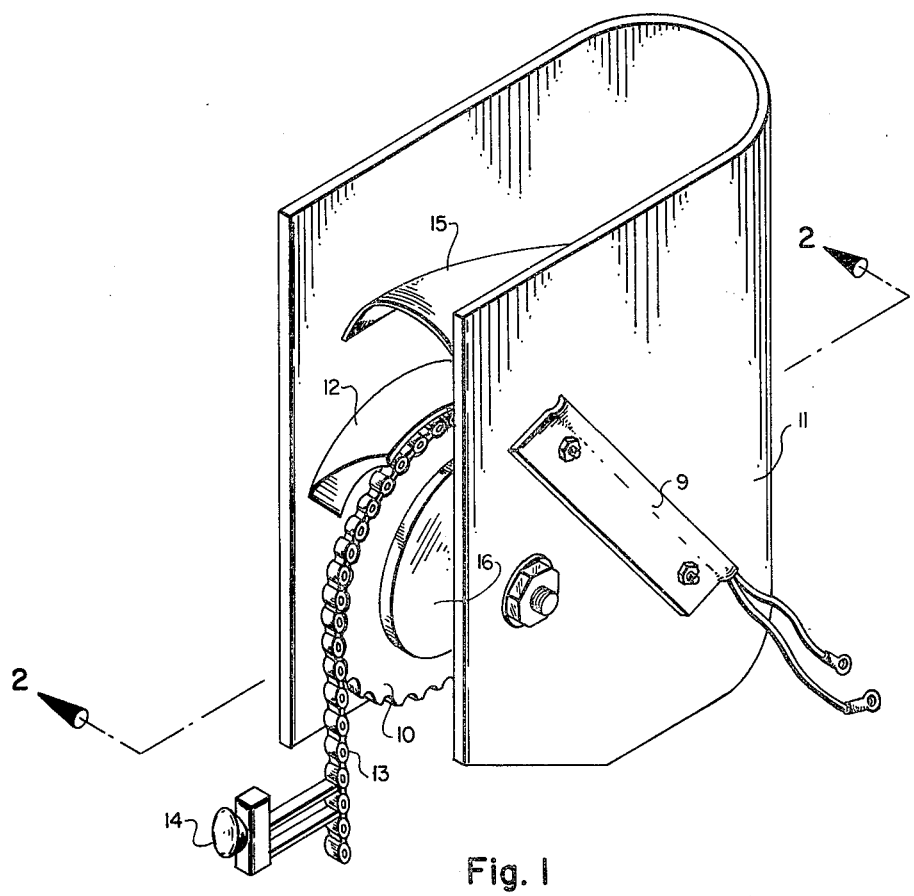
FIG. 1 is a perspective view of a sprocket assembly having curved protective guide means in which a reed switch can be embedded.

A preferred embodiment of the instant invention is illustrated in FIG. 1 wherein sprocket 10 is located inside a housing 11. The housing has attached thereto a curved guide member 12, which is preferably of hard rubber, plastic or other non-magnetic material and preferably has a radius of curvature which approximates that of the outer circumference of the sprocket to which it is adjacent. A conveyor chain 13 with cups 14 spaced along the slightly resilient, and durable, abrasion-resistant chain is illustrated to show the relationship of the curved guide means 12 to the cups, which is particularly observable in FIG. 3 inasmuch as a pair of curved guide or guard means 12 and the fender 15, see FIGS. 2, 3 and 4, form a pathway for the seed cups to follow while passing through the housing. A cover plate 9 protects electrical leads coming from a reed switch disposed in one of the curved guard members.

It is preferred that the sprocket to which the magnet is attached is an idler sprocket inasmuch as a drive sprocket would continue to rotate even though the feed conveyor was broken and planting has ceased. Also, it is preferred that the sprocket be an upper idler sprocket as remote from the furrow as possible.

Figure 2:
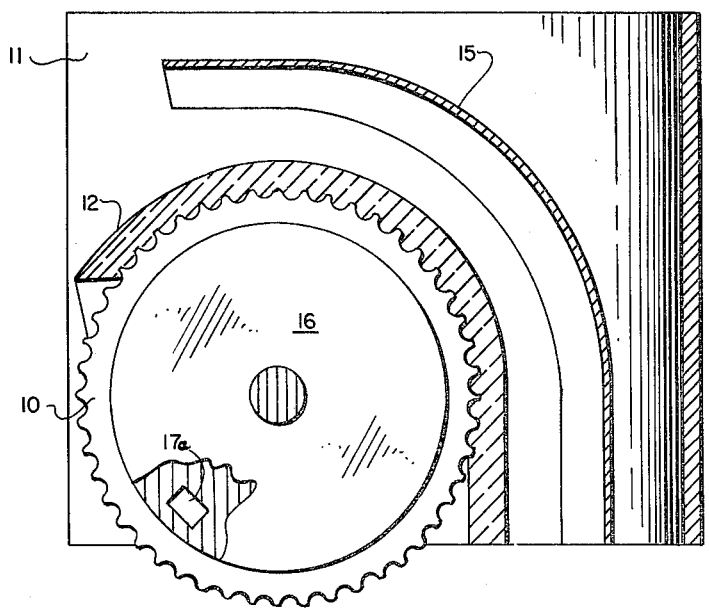
FIG. 2 is an elevational sectional view along section lines 2—2 of FIG. 1 exposing the sprocket, curved guide means and fender means.
Figure 3:
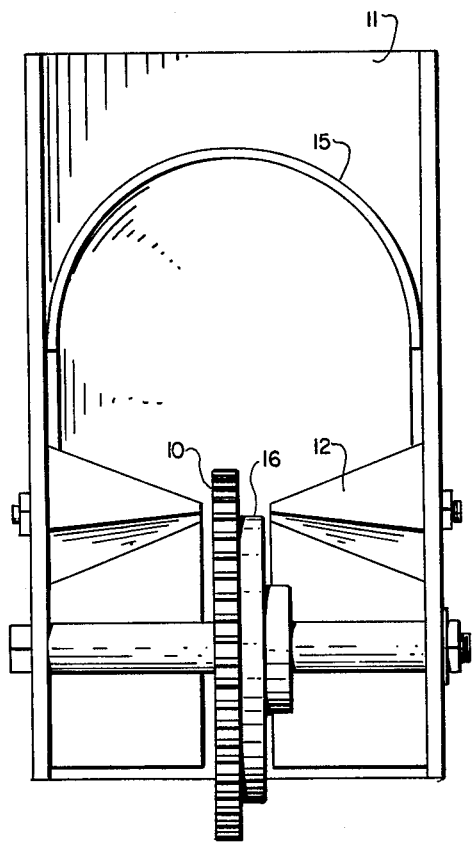
FIG. 3 is an elevational end view illustrating relationship of the fender means to the curved guide means.

In FIG. 2 a curved guide means 12 is shown in relationship to fender 15 whereby fender 15 is spaced apart from the curved guide. The curved guide follows approximately the same curvature as the sprocket and may be located adjacent the sprocket or with a slightly larger radius of curvature and located to the side but slightly outward of the sprocket. The sprocket 10, in FIG. 2, is shown with a rubber hub 16 of slightly smaller diameter which is adhered to one side of the sprocket and in which a strong permanent magnet 17a is embedded. As shown in FIG. 3, the hub 16 is located on a side of the sprocket and may be substantially any thickness, although the thickness of the hub may affect the orientation desired for the reed switch located in the guide means 12 which is closely adjacent to the hub member. In some instances, it may be preferred to have the hub sufficiently wide that it rotates within the space beneath the guide means 12 so that a vertically oriented reed switch would be most effectively activated. If the hub does not extend beneath the guide means 12, then it is preferred that the reed switch be angled so that the two limbs of the reed are in substantial alignment with the magnet so that the magnetic pull on the movable reed member will be directly towards the bottom or fixed member of the switch.

Figure 4:
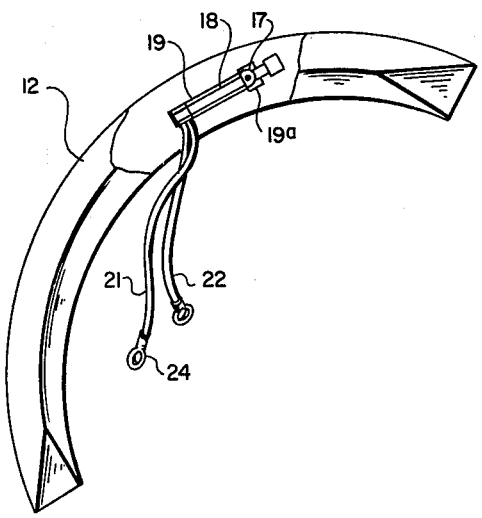
FIG. 4 is a perspective view of the fender means.
Figure 5:
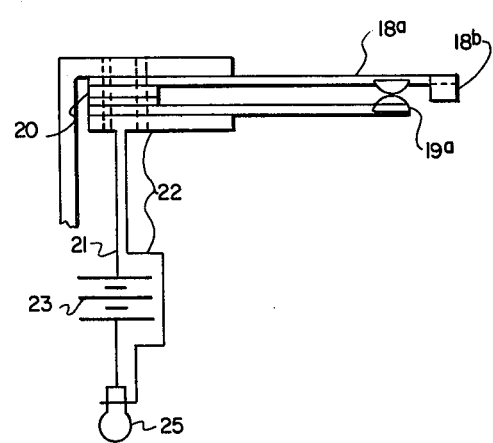
FIG. 5 is an elevational view of the curved guide means illustrating the embedment therein of a reed switch.

The placement of the reed switch within the guide means 12 is illustrated in FIGS. 4 and 5 wherein the reed switch 17 is illustrated with an upper reed or limb 18, which is the movable reed and a lower reed or limb 19 which is the fixed reed. The switch is embedded in the guide means 12 so that it is within a cavity which permits the reed switch to operate. The two reeds are separated by an electric insulator 20 which electrically isolates one reed arm or limb 18 from the other reed arm or limb 19. A pair of electrical contacts 18a and 19a are preferably attached to the opposed reeds so that certain electrical contact can be insured by the closing of the reeds.

To facilitate the closing of the reed and its attraction by the permanent magnet, a small magnet 18b with a polarity opposite to that of the permanent magnet may be attached to the movable reed 18. The strength of the magnet 18b should be such that it is not attracted by metal in the vacinity of the reed switch but is strongly attracted by the permanent magnet attached to the sprocket.

The electrical leads 21 and 22 connected to reeds 18 and 19, respectively, are connected through a source of electrical energy, such as a battery 23 and in series with a visual indicator such as a light 25. Thus, the closing of the reed switch completes the electrical circuit and causes light 25 to illiminate. Since light 25 will illuminate only once each revolution of sprocket 10 the flashing light serves as a positive and noticeable indicator that the idler sprocket is turning, the chain conveyor is operating and the planter is, in fact, planting.

Other visual indicators may be utilized in place of light 25 such as an electronic counter. Lamp 25 may be an ordinary electrical lamp such as a flashlight bulb or it may be a light emitting diode which is more durable and requires less energy, thus providing a visual indicator which is very rugged and which can be powered by small dry cell batteries for a very long period of time.

We claim:

1. In a tuber planter employing a conveyor with feed cups to discharge seed tubers into a furrow, an upper idler sprocket member about which the tuber conveyor moves, a housing enclosing at least a portion of said sprocket, and an electromagnetic monitor comprising:
    (a) a reed switch protectively positioned on the interior of said housing closely adjacent one face of said sprocket and housed within one of a pair of curved guard members having a radius of curvature approximating that of the sprocket circumference wherein said guards are attached to said housing in opposed relationship on opposite sides of said sprocket to form a curved pathway for passage of feed cups traveling about said sprocket;
    (b) a permanent magnet protectively encased in a rubger disk member adhered to one face of said sprocket in a position near the outer circumference of said sprocket whereby it passes closely adjacent to said reed switch once each revolution of said sprocket; and
    (c) a fender member which fits secured within said housing in spaced cooperative relationship with said curved guards to form a substantially enclosed passageway for said seed cups traveling about said sprockets.

2. The monitor of claim 1 wherein said reed switch is electrically connected to a remote electrical display device which indicates each passing of the permanent magnet by said reed switch.

3. The monitor of claim 2 wherein said display device is a light having an energy source serially connecting said reed switch and said light.

4. The monitor of claim 2 wherein said display device is an electrical counter having an energy source serially connecting said reed switch and said counter.

5. The monitor of cliam 2 wherein said display device is located upon a tractor pulling said tuber planter.

* * * * *

UNITED STATES PATENT OFFICE
CERTIFICATE OF CORRECTION

Patent No. 4,209,109    Dated June 24, 1980

Inventor(s) Robert B. Curl and Fred Foss

It is certified that error appears in the above-identified patent and that said Letters Patent are hereby corrected as shown below:

Col. 1, line 27, change "is" to ---in---;

Col. 4, line 13, change "rubger" to --- rubber ---;

Signed and Sealed this

Twenty-third Day of September 1980

[SEAL]

Attest:

SIDNEY A. DIAMOND

Attesting Officer

Commissioner of Patents and Trademarks